No. 781,830. PATENTED FEB. 7, 1905.
K. KIEFER.
FILTER.
APPLICATION FILED MAY 4, 1903.
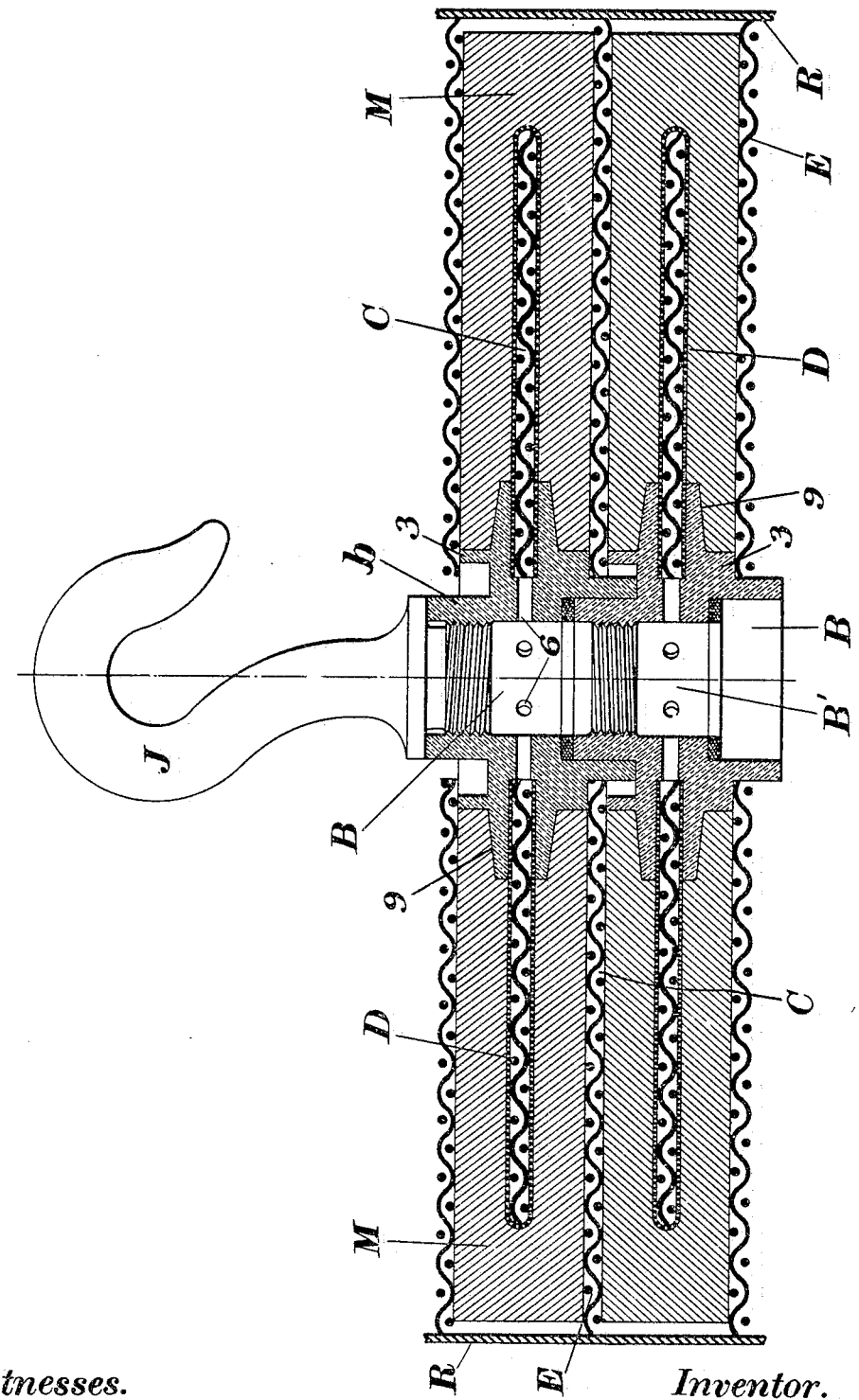
Witnesses. Inventor.

No. 781,830. Patented February 7, 1905.

UNITED STATES PATENT OFFICE.

KARL KIEFER, OF CINCINNATI, OHIO.

FILTER.

SPECIFICATION forming part of Letters Patent No. 781,830, dated February 7, 1905.

Application filed May 4, 1903. Serial No. 155,675.

*To all whom it may concern:*

Be it known that I, KARL KIEFER, a citizen of the United States, and a resident of Cincinnati, in the county of Hamilton and State of Ohio, have invented new and useful Improvements in Filtering Apparatus, of which the following is a specification.

My invention relates to filters of the class in which pulp or similar filter mass is employed as the clarifying medium.

In my application for Letters Patent of the United States filed by me April 29, 1901, Serial No. 57,970, I describe a filter in which the filter elements are made of filter layers and are provided with means for conducting the liquid to and from such layers, consisting of fluid-ways made of sheets of woven-wire cloth interposed between the filter layers and suitably supported in place both at their centers and peripheries. The central means for supporting such woven-wire cloths and at times for supplying the liquid to and draining it from such cloths consist of a hub of peculiar form original with myself. I have also shown means of transporting these filter elements to and from the filter-casing. This arrangement forms the subject-matter of the present application. It is illustrated in the accompanying drawing, which is a vertical cross-section of two filter elements assembled within the casing.

In the drawing, M is a mass of compressed filter-pulp formed into flat disks of circular form, each filtering element consisting of two of these layers. Between two of these layers are embedded woven-wire screens C, similar to the arrangements shown in the above-mentioned application. Each filter element is separated from the other by screens E, which are of coarse weave. The screens C are protected by finer woven screens D, fine enough to retain the fibers of the pulp. Connecting with the screens C and centrally located is the hub B. In direct contact with the screen are flanges 9 of smooth external surface, so that the layers of compressed pulp will cling closely to them without permitting any liquid to creep between them and the hub. Being of considerable thickness, they diminish the cross-section of the pulp layers in contact therewith, producing, therefore, greater compression, which aids in preventing the cloudy liquid from passing alongside the filter-layer edge and the side surfaces. Each hub B has a wide central vertical opening B', and surrounding this is an inner annulus $b$. A series of radial holes 6 connect the wire screens C with the central opening B'. The cloudy liquid passes through the screen to the central opening. There is a wider annulus 3 concentric with the annulus $b$ to form the center hole and border for the filter layers. The smaller annulus B is threaded on the inside and receives the hook J or any other lifting instrument that is suitable for the purpose. It will be seen that the whole filter element can be lifted out therewith from the filter-casing.

R is a surrounding drum shown in cross-section.

What I claim as my invention, and desire to secure by Letters Patent, is—

1. In a filter, the combination of a drum, a series of superimposed filter elements, each consisting of two filter layers of compressed pulp, embedded in which is a liquid-conductor, and means for transporting said filter layers in pairs.

2. In a filter, the combination of a drum, a series of superimposed filter elements, each consisting of two filter layers of compressed pulp, embedded in which is a liquid-conductor, and central means for transporting said filter layers in pairs.

3. In a filter, the combination of an exterior drum, of a series of filter layers of compressed pulp, within two of which is embedded a circular liquid-conductor for clear liquid, and means attached to said liquid-conductor for transporting said filter layers.

4. In a filter, the combination of an exterior drum, of a series of filter layers of compressed pulp, within two of which is embedded a circular liquid-conductor, consisting of wire screen, for the clear liquid, with means attached to said liquid-conductor for transporting the filter layers.

5. In a filter, the combination of a drum, a series of superimposed filter elements, each consisting of two filter layers of fibrous material, embedded in which is a liquid-conductor, and means for transporting said filter layers in pairs.

6. In a filter the combination of a drum, a series of superimposed filter elements, each consisting of two filter layers of fibrous material, embedded in which is a liquid-conductor, and central means for transporting said filter layers in pairs.

7. In a filter, the combination of an exterior drum, of a series of filter layers of fibrous material, within two of which is embedded a circular liquid-conductor for clear liquid, and means for transporting said filter layers.

8. In a filter, the combination of an exterior drum, of a series of filter layers of fibrous material, within two of which is embedded a circular liquid-conductor, consisting of wire screen, for the clear liquid, with means attached to said liquid-conductor for transporting the filter layers.

Witness my hand, this 1st day of May, 1903, at the city of Cincinnati, in the county of Hamilton and State of Ohio.

KARL KIEFER.

Witnesses:
H. L. RAMBEAU
G. W. WERDEN.